Oct. 14, 1930.  J. C. McCUNE  1,778,117
DOOR INTERLOCKING DEVICE
Filed May 25, 1928    2 Sheets-Sheet 1
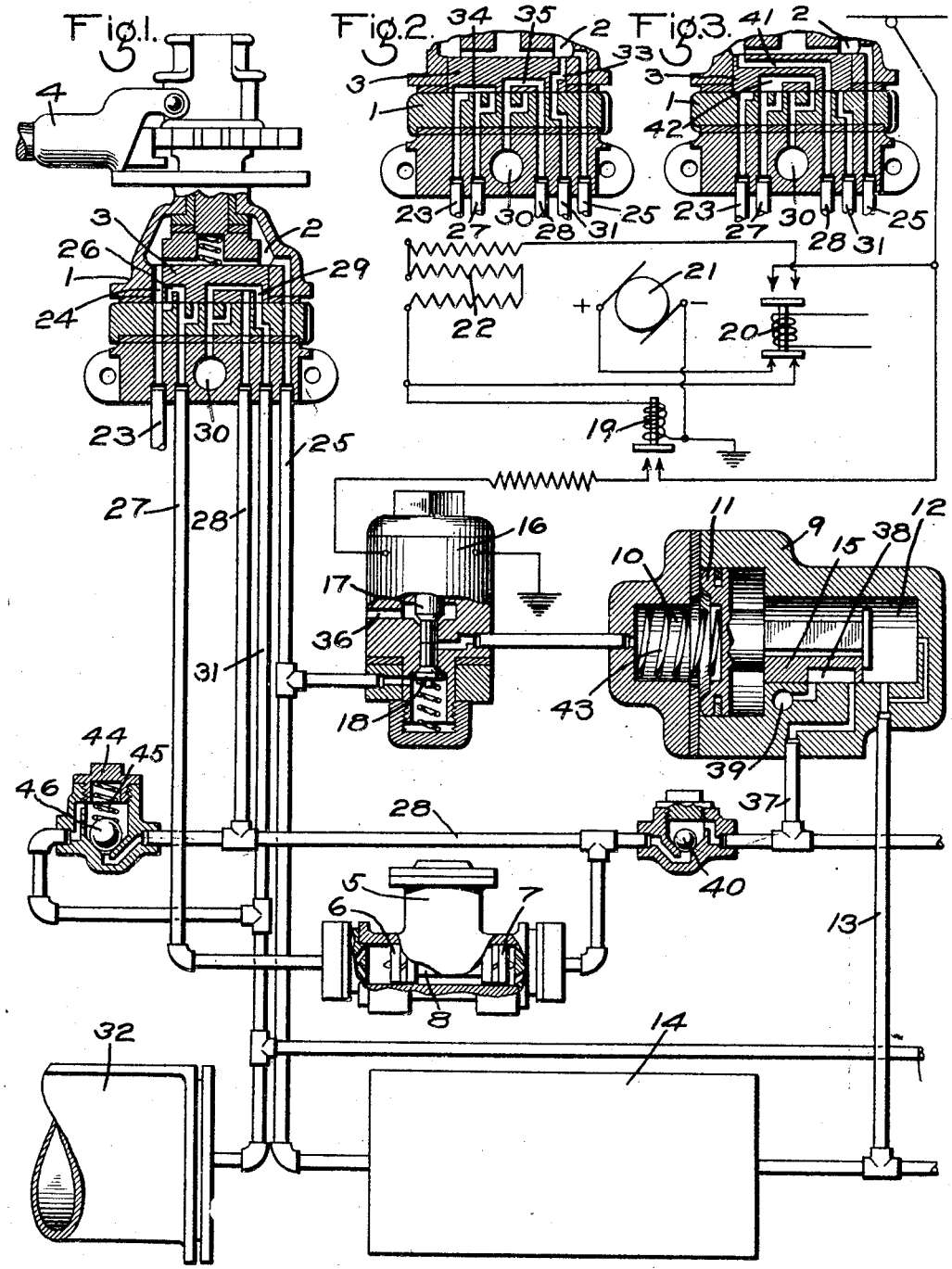
INVENTOR
JOSEPH C. McCUNE
BY
Wm. N. Cady
ATTORNEY

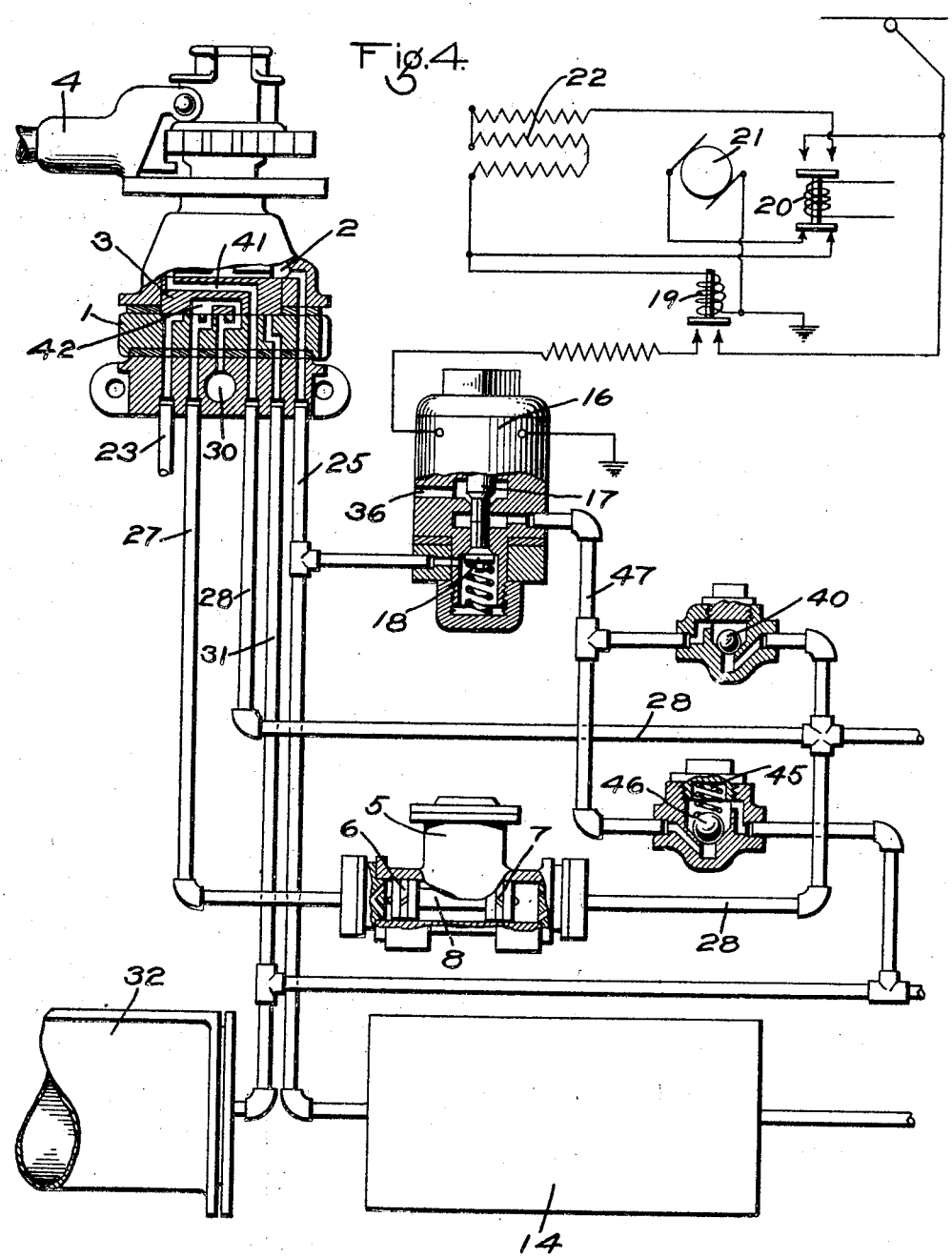

Patented Oct. 14, 1930

1,778,117

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

DOOR-INTERLOCKING DEVICE

Application filed May 25, 1928. Serial No. 280,493.

This invention relates to car door and brake controlling apparatus and has for its principal object to provide an equipment in which the car doors cannot be opened until the speed of the car has been reduced to a very low degree, or with the car practically at a stop.

In the accompanying drawing; Fig. 1 is a diagrammatic view of a car door and brake controlling equipment embodying my invention; Fig. 2 a sectional view of the brake valve device, showing the rotary valve in brake application position; Fig. 3 a sectional view of the brake valve device, showing the rotary valve in the car door opening position; and Fig. 4 a diagrammatic view of a car door and brake controlling equipment, showing a slight modification of my invention.

The equipment shown in Fig 1 comprises a brake valve device 1 having a casing with a valve chamber 2 containing a rotary valve 3 adapted to be operated by a handle 4.

A door engine 5 is provided comprising a casing having a piston cylinder containing pistons 6 and 7 connected by a stem 8 and adapted upon movement in one direction to effect the closing of the car doors and upon movement in the opposite direction to effect the opening of the car doors.

The equipment includes a valve device 9, comprising a casing having a piston chamber 10 containing a piston 11 and a valve chamber 12 connected to a pipe 13 leading to the main reservoir 14 and containing a slide valve 15 adapted to be operated by piston 11.

A magnet valve device controls the fluid pressure in piston chamber 10 and comprises a magnet 16 and double beat valves 17 and 18 adapted to be operated by said magnet. The circuit of magnet 16 is controlled by a counterelectro-motive force relay 19, the relay being adapted when energized to maintain the circuit of magnet 16 open and when substantially deenergized to close said circuit.

A relay 20 is adapted when the car is running and current is supplied to the car motor 21 to close a circuit from the source of current, through a resistance 22 to the relay 19 and when current is cut off from the car motor to close a circuit through the car motor to the relay 19, so that the energization of the relay 19 depends upon the counterelectromotive force generated by the motor.

In the release position of the brake valve device 1, as shown in Fig. 1, the usual brake pipe 23 is connected through port 24 in the rotary valve with valve chamber 2, which chamber is charged with fluid under pressure, as supplied through pipe 25 from the main reservoir 14. The piston 6 of the door engine 5 is subject to brake pipe pressure, as supplied through cavity 26, in the rotary valve, and pipe 27. The piston 7 is connected through pipe 28 and cavity 29 in the rotary valve 3 with an atmospheric exhaust port 30. The pistons 6 and 7 are therefore shifted to the right, as shown in Fig. 1, in which position the car door or doors are held closed by the door engine.

The straight air pipe 31, which is connected to the usual brake cylinder 32, is connected through cavity 29 with exhaust port 30, so that the brake cylinder is at atmospheric pressure.

If the car motor is supplied with current in the usual manner, and is running along the road, the relay 20 will be deenergized and will be in a position opposite to that shown in Fig. 1, so that a circuit is closed through the relay 19 and the resistance 22, from the source of current.

When it is desired to stop the car, the brake valve device is turned to brake application position, as shown in Fig. 2, in which a port 33 in the rotary valve connects valve chamber 2 with straight air pipe 31. Fluid under pressure is therefore supplied to the brake cylinder 32 to effect an application of the brakes.

In this position, the door closing pipe 27 is still connected, through cavity 34 with the brake pipe 23, while the door opening pipe 28 is connected through cavity 35 with exhaust port 30, so that the door engine is maintained in its door closing position.

The supply of current being cut off from the car motor 21, while the car is being brought to a stop, the relay 20 is deenergized and will assume the position shown in Fig. 1, in which a circuit is closed, so that the counterelectro-motive force of the motor acts to energize the relay 19. With the relay 19 energized, the circuit of magnet 16 is held open and the valve 18 is seated, while the valve 17 is unseated. With the valve 17 unseated, the piston chamber 10 is vented to the atmosphere at port 36, so that piston 11 is maintained in its left hand position, as shown in Fig. 1.

In this position, pipe 37 is connected through cavity 38 with an exhaust port 39, so that if fluid under pressure should be supplied to pipe 28, it would not build up a pressure on the door opening piston 7 of the door engine, since fluid would flow past the check valve 40 and to the atmosphere by way of exhaust port 39.

If, therefore, while the car is being brought to a stop and a counterelectro-motive force is generated by the motor 21, sufficient to energize the relay 19, the brake valve should be turned to the door opening position, as shown in Fig. 3, the door engine will not be operated to open the car doors, although in this position, a port 41 in the rotary valve connects the valve chamber 2 with the door opening pipe 28, while cavity 42 connects the door closing pipe 27 with exhaust port 30.

When, however, the car has been brought practically to a stop, the counterelectro-motive force will not be sufficient to energize the relay 19 and the relay will then operate to close a circuit for energizing the magnet 16. With the magnet 16 energized, the valve 17 will be seated, while the valve 18 will be unseated, so that fluid under pressure from the main reservoir 14 will be supplied to piston chamber 10. The piston 11 will then be shifted to the right by the aid of spring 43, in which position, the cavity 38 in slide valve 15, connects pipe 37 with pipe 13.

If the brake valve device is now turned to the door opening position, fluid under pressure supplied to the door opening pipe 28 will be prevented from escaping by way of pipe 37 and exhaust port 39, so that the door engine will then be shifted to the left, to thereby effect the opening of the car door.

If the pressure in the brake cylinder 32 was not built up to a predetermined degree when the brakes were previously applied to stop the car, the pressure will be built up by flow from the pipe 28 past a pressure limiting valve device 44 to the brake cylinder. When the pressure in the brake cylinder has been increased to a predetermined degree, the spring 45 will operate to hold the check valve 46 of the pressure limiting valve device closed.

According to the equipment shown in Fig. 4 of the drawings, the valve device 9 is dispensed with and the door opening pipe 28 is connected directly to the magnet valve device.

With this arrangement, so long as the relay 19 is held energized by the counterelectro-motive force and the magnet 16 is maintained deenergized, the pipe 47 is open to the atmospheric port 36, so that fluid under pressure, if supplied to the door opening pipe 28, would be vented by flow past the check valve 40 and through pipe 47 to the atmospheric port 36, thus preventing the operation of the door engine to open the car door.

When the magnet 16 is energized upon the deenergization of the relay 19, the valve 17 seats, while the valve 18 unseats, so that fluid under pressure from the main reservoir 14 flows from pipe 25 to pipe 47 and operates to hold the check valve 40 seated.

Fluid under pressure supplied to the door opening pipe 28 will then be effective to operate the door engine 5 and thus cause the car doors to be opened. Fluid under pressure supplied to pipe 47 also flows past the pressure limiting check valve 46 to the brake cylinder 32, so that the brake cylinder pressure is built up to a point such that the spring 45 will operate to cause the check valve 46 to seat.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a controlling apparatus for a motor driven vehicle, the combination with mechanism for controlling a car door, of means for operating said mechanism to effect the opening of the car door, valve means operative to prevent the operation of said mechanism to open the car door, electrically controlled means adapted upon energization to effect the operation of said valve means, and means controlled by the counterelectro-motive force of the vehicle motor for controlling the circuit of said electrically controlled means.

2. In a controlling apparatus for a motor driven vehicle, the combination with a door engine operated by fluid under pressure for effecting the opening of a car door, of a manually operated valve device having an always open pipe through which fluid under pressure is supplied to said door engine, valve means for normally connecting said pipe to the atmosphere, and electrically controlled means for controlling the operation of said valve means.

3. In a controlling apparatus for a motor driven vehicle, the combination with a door engine operated by fluid under pressure for effecting the opening of a car door, of a manually operated valve device, a pipe providing an unobstructed connection between said valve device and said door engine and through which fluid under pressure is supplied to the door engine by operation of said valve device, valve means for controlling communication from said pipe to the atmosphere, electrically controlled means for controlling the operation of said valve means, and means controlled by the counterelectromotive force of the vehicle motor for controlling the circuit of said electrically controlled means.

4. The combination with a door engine operated by fluid under pressure for controlling the opening and closing of a car door, of a manually operated valve device for controlling the fluid pressure on said door engine, a door opening pipe connecting said valve device with said door engine, a door closing pipe connecting said valve device with said door engine, a magnet valve device operated when deenergized to connect said door opening pipe to the atmosphere, and means energized by the counterelectro-motive force of the car motor for controlling the circuit of said magnet valve device.

5. In a car door and brake controlling apparatus, the combination with a brake cylinder and a door engine operated by fluid under pressure for effecting the opening of a car door, of a manually operated valve device for supplying fluid under pressure to said door engine, valve means operative in one position to prevent the building up of fluid pressure on said door engine and in another position to supply fluid under pressure to the brake cylinder and to permit the building up of fluid pressure on said door engine, and electrically controlled means for controlling the operation of said valve means.

In testimony whereof I have hereunto set my hand, this 22nd day of May, 1928.

JOSEPH C. McCUNE.